United States Patent
Abraham et al.

(10) Patent No.: US 10,785,493 B2
(45) Date of Patent: Sep. 22, 2020

(54) METHOD OF COMPRESSING AND DECOMPRESSING IMAGE DATA

(71) Applicant: Arnold & Richter Cine Technik GmbH & Co. Betriebs KG, Munich (DE)

(72) Inventors: Kevin Abraham, Munich (DE); Florian Bauer, Friedberg (DE); Peter Geissler, Munich (DE)

(73) Assignee: ARNOLD & RICHTER CINE TECHNIK GMBH & CO. BETRIEBS KG, Munich (DE)

( * ) Notice: Subject to any disclaimer, the term of this patent is extended or adjusted under 35 U.S.C. 154(b) by 0 days.

(21) Appl. No.: 16/568,620

(22) Filed: Sep. 12, 2019

(65) Prior Publication Data

US 2020/0084463 A1    Mar. 12, 2020

(30) Foreign Application Priority Data

Sep. 12, 2018 (DE) .................. 10 2018 122 297

(51) Int. Cl.
*H04N 19/436* (2014.01)
*H04N 19/124* (2014.01)
(Continued)

(52) U.S. Cl.
CPC ............. *H04N 19/436* (2014.11); *H04N 5/77* (2013.01); *H04N 19/124* (2014.11);
(Continued)

(58) Field of Classification Search
CPC .. H04N 19/436; H04N 19/124; H04N 19/136; H04N 19/182; H04N 19/184; H04N 19/186; H04N 5/77
See application file for complete search history.

(56) References Cited

U.S. PATENT DOCUMENTS

| 4,984,076 A | 1/1991 | Watanabe et al. |
| 5,764,374 A | 6/1998 | Seroussi et al. |

(Continued)

FOREIGN PATENT DOCUMENTS

EP    1 467 570 A1    10/2004

OTHER PUBLICATIONS

German Search Report dated May 24, 2019 in connection with German Patent Application No. 10 2018 122 297.1.
(Continued)

*Primary Examiner* — Thai Q Tran
*Assistant Examiner* — Sunghyoun Park
(74) *Attorney, Agent, or Firm* — Amster, Rothstein & Ebenstein LLP (57) ABSTRACT

A method of compressing image data is described in which a difference value is formed for a respective pixel, said difference value corresponding to a predetermined relation between the pixel value and the estimated pixel value of the respective pixel and being represented by a first binary word that has a first length. The first binary word is encoded by at least one second binary word that has a second predetermined length. the first length is compared with the second length to determine whether the first length is smaller than the second length, with the first binary word otherwise being completely encoded by a single second binary word when the first length is smaller than the second length, and with the first binary word otherwise being completely encoded by a plurality of second binary words. A method of decompressing image data is furthermore described that corresponds to a reversal of the compression method.

26 Claims, 4 Drawing Sheets

(51) Int. Cl.
*H04N 19/136* (2014.01)
*H04N 19/182* (2014.01)
*H04N 19/184* (2014.01)
*H04N 19/186* (2014.01)
*H04N 5/77* (2006.01)

(52) U.S. Cl.
CPC ......... *H04N 19/136* (2014.11); *H04N 19/182* (2014.11); *H04N 19/184* (2014.11); *H04N 19/186* (2014.11)

(56) References Cited

U.S. PATENT DOCUMENTS

| | | | |
|---|---|---|---|
| 6,744,929 B1 | 6/2004 | Okada | |
| 8,929,672 B2 | 1/2015 | Cieslinski et al. | |
| 2002/0064231 A1* | 5/2002 | Felts | H04N 19/105 375/240.21 |
| 2002/0172427 A1* | 11/2002 | Malvar | H04N 1/417 382/238 |
| 2004/0228538 A1* | 11/2004 | Onuma | H04N 19/176 382/239 |
| 2004/0247192 A1* | 12/2004 | Kajiki | H04N 19/176 382/239 |
| 2005/0123206 A1* | 6/2005 | Sakai | H04N 19/46 382/238 |
| 2007/0126611 A1* | 6/2007 | Streater | H04N 19/1887 341/67 |
| 2008/0199088 A1* | 8/2008 | Chen | H04N 19/61 382/232 |
| 2014/0119669 A1* | 5/2014 | Ingham-Dempster | H04N 19/129 382/232 |
| 2017/0070750 A1 | 3/2017 | Chen et al. | |

OTHER PUBLICATIONS

Netravali, A. N., "Picture Coding—A Review," Proceedings of the IEEE, vol. 68, No. 3, Mar. 1980, pp. 366-407.

Extended European Search Report dated Feb. 5, 2020 in connection with European Patent Application No. 19196996.3.

Anonymous: "Universal Coding (part III) Harder, Better, Faster, Stronger," Feb. 18, 2014, XP055661472, via internet: //hbfs.wordpress.com/2014/02/18/universal-coding-part-iii/.

Anonymous: "Variable-length quantity—Wikipedia," May 8, 2018, XP055661476, via Internet: //en.wikipedia.org/w/index.php?title=Variable-length_quantity&oldid=840201447.

* cited by examiner

METHOD OF COMPRESSING AND DECOMPRESSING IMAGE DATA

The invention relates to a method of compressing image data which include a plurality of pixel values which are associated with a respective pixel.

Such image data are typically generated in an electronic camera, in particular in a digital motion picture camera (video camera), by means of an image sensor. The image sensor typically includes a plurality of light-sensitive sensor elements which are arranged in rows and columns and correspond to a respective pixel (picture element). The sensor elements generate electric signals in dependence on the incident light which correspond to a respective brightness value. The sensor elements can be provided with a pattern of color filters so that each brightness value is associated with a color channel, in particular red, green and blue. For this purpose, the so-called Bayer pattern is known in which a red filter element, two green filter elements and a blue filter element are respectively provided in a regular arrangement. However, monochrome image sensors and image sensors having differently formed pixels can generally also be considered, in particular sensors having a plurality of color channels, e.g. RGB-W sensors or RGB-IR sensors.

The volume of the image data has substantially increased in modern cameras as the spatial resolution has increased, i.e. as the number of pixels per image has increased. Compression processes are therefore used to compress the image data generated in the camera and to write them to a memory of the camera or to output them to an external memory in compressed form. The compressed image data can be decompressed again later. There are lossless and lossy compression methods for this. An image data compression is based, like every application of data compression, on either changing the original data, i.e. the pixel values, into a completely reconstructable form that requires less memory space (lossless) or changing them into a partly reconstructable form that admittedly likewise requires little memory space, but does not include all the data (lossy). In lossy compression, data are therefore removed; however, their loss should be practically not perceptible. An image data compression can in particular comprise a prediction method and an entropy encoding. In addition, preprocessing steps can be provided that can in particular be lossy and can thus overall provide a lossy compression (even if said combination of the prediction method and the entropy encoding is lossless). A requantization process can in particular be used.

It is furthermore known to transform the image data in the frequency space (e.g. by discrete cosine transformation in accordance with JPEG or with the aid of wavelets in accordance with JPEG 2000), with the representation in the frequency space taking place by coefficients which each describe the amplitude of specific frequencies. To compress the data, these coefficients are quantized in dependence on the frequency, with the coefficients corresponding to the high frequencies being transmitted imprecisely or being discarded. Fine and radio frequency structures in the image are hereby removed. Images compressed in this manner therefore frequently have a very smooth, washed-out, and slightly blurred image impression. The image errors which arise in the compression are difficult to predict and are moreover not restricted to individual pixels, but rather occur as additional structures (so-called artifacts). In addition, the transformation into the frequency space is associated with a calculation effort so that fast implementations such as are required for motion picture cameras are associated with a correspondingly high technical effort.

Compression methods are also known in which pixel values are encoded by a variable number of bits. This approach is based on the recognition that some values occur more frequently in the image data than others. The frequent values can advantageously be encoded by a few bits. More bits can be provided for the rarer values; however, they only insignificantly increase the total data volume due to the small frequency. This approach is also called entropy encoding. A problem with this kind of encoding comprises the fact that it is comparatively poorly parallelizable. This means that the pixel values can only be encoded (and decoded) after one another and thus at a comparatively low speed due to the variable number of bits.

It is an object of the invention to provide a faster compression method which achieves a good quality of the decompressed images and avoids the formation of artifacts with a high compression factor. The compression method should preferably also be lossless.

This object is satisfied by a method having the features of claim 1.

In the method in accordance with claim 1, the pixel values are compressed for at least some pixels in accordance with the following steps:
  determining an estimated pixel value of the respective pixel in dependence on the pixel value of at least one predetermined other pixel while using at least one estimation rule;
  forming a difference value of the respective pixel that corresponds to a predetermined relation between the pixel value and the estimated pixel value of the respective pixel, with the difference value being represented by a first binary word that has a first length, with the first length being an effective length of the first binary word;
  encoding the first binary word by at least one second binary word, with the at least one second binary word having a second length that is a predetermined length of the respective second binary word,
wherein the first length is compared with the second length to determine whether the first length is smaller than the second length;
with the first binary word being completely encoded by a single second binary word when the first length is smaller than the second length; and
with the first binary word otherwise being completely encoded by a plurality of second binary words.

In summary, the pixel values are first converted into difference values that are then each encoded by at least one binary word that has a predetermined length. A respective difference value is here encoded either by a single binary word or by a plurality of binary words, with the binary words each having a predetermined length that can in particular be a fixed length. Due to the predetermined length, the encoding process can be carried out in parallel for a plurality of difference values to substantially accelerate the encoding process overall, in particular on a use of graphics processors that are particularly suitable for a fast parallel processing of data.

The determining of the estimated pixel values preferably takes place by a so-called prediction process in which a respective pixel value is e.g. estimated or predicted (estimation rule) by a weighted linear combination of predetermined other pixel values. The difference values thus correspond to an estimation error or prediction error that as a rule is considerably smaller than the underlying pixel value. The difference values hereby cover a smaller value range than the pixel values themselves or they are in a tighter distribution closer to the value of zero. The difference values can hereby advantageously be encoded binarily by a smaller number of bits so that the image data can be encoded overall by a smaller number of bits and can hereby be compressed.

The difference value of the respective pixel is generally present in binary form, i.e. the difference value is represented by a number of bits of a first binary word that can adopt either the value zero or the value one. The difference value preferably corresponds to a decimal number that is represented by the first binary word in the so-called binary number range. Within the framework of the method, the difference value can first be present as a decimal value and then be transformed into a binary number to obtain the first binary word. In this respect, the difference value can also be quantized and further processed. It is, however, also possible that the difference value is directly determined as the first binary word, for example when the respective pixel value and the estimated pixel value are each represented and processed by binary words. Independently of the specific determination of the first binary word, the first binary word can be considered as an intermediate encoding of the underlying pixel value. The first binary word is then further encoded by at least one second binary word as will be described in even more detail below.

The first binary word has an effective first length that preferably depends on the amount of the difference value. The effective length can generally correspond to the number of bits that are provided in the binary numerical system for the representation of a decimal number. If more bits are provided, they are preferably set to the value zero (for instance on carrying out the method on a computer that only processes binary words having a fixed length). For example, the first binary word in an ascending order of bits can have a plurality of bits that are each set to the value zero after the last bit that is set to the value one ("most significant bit"). The effective length thus corresponds to the number of bits between and including the "least significant bit" and the "most significant bit", i.e. the least significant bit and the most significant bit are included in the count.

The first length of the first binary word preferably increases with the amount of the difference value that is represented by the first binary word. The first length therefore depends on the difference value so that high difference values, and thus rare difference values, are represented by more bits than low or frequent difference values. The first binary word is now encoded by one or more second binary words that each have a predetermined second length and hereby enable an advantageous parallel encoding of a plurality of first binary words. Each of the plurality of second binary words preferably has the second length, i.e. the second length is identical for all the second binary words. The advantage of the parallel encoding can hereby be maximized. As will still be explained, the plurality of second binary words can, however, also have different predetermined second lengths.

Depending on the first length, a respective first binary word is encoded either by a single second binary word or by a plurality of second binary words. If the first length is smaller than the respective predetermined second length, sufficient bits are available in the second binary word to encode the first binary word completely and thus in a lossless manner. If the first length is greater than or equal to the second length, the first binary word is encoded by a plurality of second binary words, i.e. the information of the first binary word is distributed over a plurality of second binary words to encode the first binary word completely and thus in a lossless manner. The first binary word is therefore adaptively encoded in dependence on the first length in this manner. The advantage of the variable first length by which the image data are substantially compressed is combined with the advantage of a predefined and in particular fixed word length for the second binary words. A compression method is provided in this manner that can also be carried out particularly fast with a high degree of compression. Furthermore, no bits have to be discarded during the encoding so that a good quality of the decompressed image data is ensured, i.e. the formation of artifacts is avoided. The high degree of compression enables a reduced use of memory space and a particularly fast transmission of the compressed data to a remote server that e.g. implements a virtual cloud. The data can furthermore also be encoded fast after a recording of the pixel values so that said data can even be sent to a server in real time. It is hereby also made possible to reduce the memory resources provided at a motion picture camera, for example. The invention thus makes a substantial contribution overall to the globally networked society in which current image data should be available immediately and everywhere.

The second binary words by which a respective first binary word is encoded can be concatenated or strung together in a bitstream. The order of the concatenation can correspond to the order of the first binary words that are observed for a respective encoding. It is, however, also possible to provide a reverse order for all the second binary words or also for only some of the second binary words It is in particular possible in the case of an encoding by the plurality of second binary words to write this plurality of second binary words to a bitstream in a reverse order. This has the advantage that all the plurality of second binary words do not first have to be read in the course of the decoding to start with the formation of the first binary word. For example, the order of the second binary words can correspond in the course of the encoding to an order of the significance of the bits of the first binary word (i.e. starting with the least significant bit and ending with the most significant bit of the first binary word). The second binary word can then be written to the bitstream in the reverse order. Single secondary binary words can in contrast be written in the regular order.

Within the present disclosure, the term "ascending order" is generally to be understood as a predetermined or defined order. This order can be defined by a "reading direction" of bits, e.g. from left to right, or by an order of the significance of bits in a respective binary word (e.g. from right to left).

All the pixel values of a respective image data set that can, for example, correspond to an individual image of an image sequence do not generally have to be compressed in accordance with the method in accordance with the invention, but the method in accordance with the invention can also only be carried out for some of the pixel values. The compression can, for example, be preceded by an analysis of the image data, with a first compression method (in particular the method in accordance with the invention) being used as the result of the analysis for some (variable or predetermined) image regions and with a second compression method differing from the first being used for other image regions, in particular to achieve a greater compression rate and/or a smaller memory requirement at the cost of a higher processing effort and/or a worse parallelizability.

The invention is generally also not restricted to a specific order of the compression of the pixel values or of the arrangement of the associated pixels.

It is also not precluded within the present invention that preprocessing steps (e.g. quantization, linearization, gamma curve) are carried out after the generation of the original image data (for example by means of an image sensor) and before the compression of the pixel values.

Advantageous embodiments are disclosed in the dependent claims, in the description and in the Figures.

In accordance with a preferred embodiment, the at least one secondary binary word comprises at least one encoding information bit, wherein the encoding information bit is set to a first value when the first binary word is encoded by a single second binary word, and wherein otherwise the encoding information bit of at least one of the plurality of second binary words is set to a second value. The encoding information bit thus indicates the manner in which the first binary word has been encoded. This information can in particular be used in a subsequent decoding to completely reconstruct the first binary words. Only one encoding information bit is preferably provided in every second binary word, whereby the encoding process (and also the decoding process) is particularly simple and reliable. Different procedures are, however, also possible. A plurality of encoding information bits can in particular be used to provide more complex information on the encoding process for the decoding. It is furthermore conceivable that all the second binary words do not comprise an encoding information bit, in particular on an encoding of the first binary word by a plurality of second binary words. A piece of encoding information can thus, for example, be limited to one specific binary word or to a plurality of specific second binary words.

Since the second length of the respective second binary word or words is known, a respective starting point can be directly determined on a later decoding. It is, however, also possible that the start of a respective pixel or of the associated second binary word or words is determined by an evaluation of the encoding information bit. It is furthermore also possible that respective encoding information bits are not elements of respective secondary binary words. Encoding information bits can thus also be stored separately from the second binary words, e.g. in a header file, and can be taken into account using an allocation table on a later decoding.

Within the present disclosure, the above-named first value of the encoding information bit is preferably always zero and the above-named second value of the encoding information bit is preferably always one. A reversal of this association is, however, also possible. It is furthermore understood that the setting of a bit is to be understood in the sense that it is ensured that the respective bit has the desired value. For this purpose, for example, a check can be explicitly or implicitly made before any setting of the bit whether the bit already has the desired value. If this is the case, the bit does not have to be set again, with this, however, also being possible for reliability reasons. It is furthermore understood that in the binary system a bit can only adopt one of two values. The check whether the bit is e.g. set to the first bit can thus also take place in that a check is made whether the bit is set to the second value.

The first binary word is preferably encoded by the at least one second binary word in that the encoding information bit is added to the first binary word or to a partial word of the first binary word to form the at least one second binary word, with the encoding information bit having a predetermined position in the second binary word. The predetermined position can in particular be an outer or marginal position in the second binary word. The position of the encoding information bit preferably corresponds to the position of the least significant bit in the second binary word. For this purpose, the encoding information bit can be appended to the first binary word or to the partial word, e.g. at the side of the least significant of the respective word. The decoding process can in particular hereby be accelerated.

If the sum of the first length and of the number of the at least one encoding information bit(s) is smaller than the second length, the second binary word can be formed in that the first binary word is concatenated with a number of bits of the value zero so that the at least one second binary word has the second length. The zero-value bits are preferably appended to the first binary word at the side of the most significant bit of the first binary word (equal to one) so that the bit pattern of the first binary word is not changed. The first binary word can hereby later be particularly simply decoded.

The number of zero-value bits depends on the number of encoding information bits (preferably one encoding information bit) and on the first length. The number of zero-value bits can be determined in that the number of encoding information bits and the first length are subtracted from the second length.

It is understood that the method steps described here can generally be carried out in different manners. Said appending or also a different appending of zero-value bits can thus, for example, take place in that, starting from a second binary word in which all the bits are set to zero, some of the bits are overwritten in accordance with the bits of the first binary word or partial word. The encoding information bit can equally be appended in that a bit provided for this purpose in the second binary word is set to the value of the encoding information bit and hereby becomes the encoding information bit. In other words, at least some of the method steps described here are also to be understood in the sense of the concept or result implemented by a respective method step.

In accordance with an embodiment, the first binary word is encoded by the single second binary word in that the first binary word and the encoding information bit are concatenated with one another to form the single second binary word. The encoding is thus particularly simple, with the bit pattern or the bit sequence of the first binary word not being changed. An encoding information bit is preferably appended to the first binary word at the side of the least significant bit.

In accordance with a further embodiment, the first binary word is encoded by the plurality of second binary words in that the first binary word is fragmented or split into a plurality of partial words. In this respect, each of the plurality of partial words has a third length that is a predetermined length, in particular a fixed length, of a respective partial word and that is smaller than the second length. Furthermore, one of the plurality of second binary words is associated with each of the plurality of partial words, with each of the plurality of partial words being concatenated with the encoding information bit of the associated second binary word to form the associated second binary word. Exactly one second binary word is preferably provided for each partial word to make the encoding or a subsequent decoding efficient and particularly robust.

The fragmentation of the first binary word into the plurality of partial words preferably takes place in an ascending order of the bits of the first binary word, with a respective partial word being formed by a number of bits of the first binary word that is equal to the third length. If the third length is not a whole number multiple of the first length, the last of the plurality of partial words in accordance with the ascending order can be formed by a concatenation of a number of zero-value bits with a residual number of bits of the first binary word so that the sum of the number of zero-value bits and the residual number of bits of the first binary word is equal to the third length. The partial words therefore correspond to contiguous bit sequences or blocks of the first binary word that should have the third length. If the first length is divisible by the third length without a remainder, the partial words can be directly and completely formed by blocks of the first binary word. In the case of a remainder, the remaining bits of the first binary word will be supplemented by zero-value bits to form the last partial word. In this manner, the encoding can also be carried out completely and in a lossless manner when the first binary word cannot be exactly split into blocks of the third length.

The ascending order of bits in a binary word, in particular in the first binary word, is generally the order of bits starting with the least significant bit to the most significant bit. Other definitions are, however, conceivable in principle.

In accordance with an embodiment, the encoding information bit that is concatenated with the last of the plurality of partial words in accordance with the ascending order is set to the first value (in particular one), with the respective information bit of the remaining partial words or word being set to the second value (in particular zero). The encoding information bit in this case directly indicates in each second binary word whether the first binary word has already been completely encoded by the preceding second binary words or not. Which second binary words underlie a common first binary word and are accordingly to be used to decode this first binary word can therefore immediately be determined by evaluating consecutive encoding information bits (of directly consecutive second binary words). The image data can thus be compressed and decompressed again particularly efficiently and reliably.

The second length and the third length preferably differ by exactly the number of the at least one encoding information bit to maximize the compression factor. It is, however, also possible to provide additional bits in the second binary word, for instance for an error correction, whereby the available third length is correspondingly reduced in size.

In accordance with a further embodiment, the second length is the same for all the pixels or for a respective pixel group, with a respective pixel group representing a local image region in the image data. A second length that is the same for all the pixels has the advantage that the pixel values can be encoded particularly simply and can be decoded again via the second length without any additional information (the second length can already be known prior to the decoding since it is uniformly predefined). A second length only the same for a respective pixel group has the advantage that the second length can be varied in dependence on the image content to achieve an improved compression factor. The improved compression factor can, for example, be achieved by an increased second length with a relatively large number of large first lengths so that fewer encoding information bits have to be used overall. The information on the second length can be integrated into the compressed image data for a decompression of the image data and can be transmitted to a decoder in a bitstream, for example, that represents the compressed image data. The same can accordingly be provided if the first binary word is completely encoded by a plurality of second binary words and if the second lengths for the plurality of second binary words differ, with the different second lengths then being able to be uniformly predetermined for all the pixels or for a respective pixel group.

In accordance with a further embodiment, a plurality of pixel groups can be formed in dependence on the similarity of the difference values of the pixels so that the difference values of the pixels of a respective pixel group are more similar to one another than to the difference values of the pixels of a different pixel group. A second length can then be selected for each pixel group that is ideal in the sense of a high degree of compression for the encoding of the difference values or of first binary words.

In accordance with a further embodiment, the second length can be proportional to the amount of the difference values of a respective pixel group. For this purpose, the second length can in simple terms be selected as proportional to the first length of those first binary words that represent the difference values of a respective pixel group. For example, the second length can be selected in dependence on the average first length of the first binary words that belong to the respective pixel group. It is thus conceivable that, for a respective pixel group, the second length is e.g. the same as the average first length minus the number of encoding information bits.

The predetermined length of the respective second binary word can be constant for the plurality of second binary words if the respective first binary word is completely encoded by a plurality of second binary words. The advantage of a parallel processing can hereby be increased.

It is, however, also possible that—if the respective first binary word is completely encoded by a plurality of second binary words—the second lengths of the plurality of second binary words differ. For example, the second length can decrease as the number of second binary words that are used to encode the first binary word increases. To fix the respective second length, an indirect local evaluation of the image content can, for example, take place in that the first binary words of an image region having different values of the second length of the second binary words are encoded and in so doing the respective achieved encoding efficiency is evaluated, with that second length or those second lengths having the highest encoding efficiency being selected and this evaluation result being stored in a control table (for the later decompression). It is also conceivable that statistics of the pixel values and/or difference values are taken into account in a manner such that in most cases a fixed length is used and a differing length is only used in the rare cases.

In accordance with a further embodiment, the step of encoding the first binary word by at least one second binary word corresponds to a first encoding process, with the first binary word being encoded in accordance with a second encoding process for at least some further pixels that are not encoded in accordance with the first encoding process. In other words, a different encoding process can be provided alternatively to the first encoding process for specific image regions or pixel groups, i.e. a selection is made at least between two different encoding processes. The second encoding process can generally be configured as desired, with a Golomb-Rice encoding process in particular being possible. A selection of a respective encoding process can e.g. respectively take place in dependence on a local evaluation of the image content.

With respect to the at least one predetermined other pixel whose pixel value is used for the determination of the estimated pixel value, it is possible to pursue one or more advantageous procedures that are described in the following.

In accordance with an embodiment, the image data comprise pixel values of a plurality of mutually different colors, with the at least one predetermined other pixel not being arranged directly adjacent to the respective pixel, and with the pixel values of the respective pixel and of the at least one predetermined other pixel having the same color. In other words, only pixel values of the same color are used to estimate a pixel value. The accuracy of the estimate can hereby be improved. The color filters of the same color are frequently not directly adjacent to one another in an image sensor. This in particular applies to the already mentioned Bayer pattern. It is understood that a plurality of pixels can be used to determine the estimated pixel value to increase the accuracy of the estimated pixel value.

In accordance with a further embodiment having pixel values of a plurality of mutually different colors, the determining of the estimated pixel value of the respective pixel can take place in dependence on the respective pixel value of a plurality of predetermined other pixels. Some of these pixels are here arranged directly adjacent to the respective pixel, with the pixel values of these pixels having a different color than the pixel value of the respective pixel. Some others of the predetermined other pixels are, however, not arranged directly adjacent to the respective pixel, with the pixel values of these other pixels having the same color as the pixel value of the respective pixel. In other words, pixel values of only one or more different colors are used to determine the estimated pixel value. Correlations between the pixel values of the same color and of different colors can hereby be used to further increase the estimation accuracy.

The pixels can generally be provided in an arrangement of a plurality of rows, with the pixel values being compressed row-wise, and with the determination of the estimated pixel value of the respective pixel taking place in dependence on the respective pixel value of a plurality of predetermined other pixels. The other pixels can in this respect be arranged in the row of the respective pixel and/or in an already compressed row. Alternatively, the other pixels can be exclusively arranged in the row of the respective pixel, whereby the method can be accelerated even further.

The image data can in particular represent one frame of a time sequence of a plurality of frames, i.e. the frame can e.g. be taken from a video sequence (or motion picture sequence). The pixel values associated with the frame do not necessarily have to be recorded at a common point in time here. The pixel values can also be recorded consecutively and can be assembled to a frame.

The method can generally be configured to compress the image data in a lossless manner. "Lossless" here means that the first binary words are mapped completely and without information loss by the second binary words and can be decoded in a lossless manner. The first binary words can thus also represent quantized difference values, with the information loss by the quantization not being considered a relevant loss. A respective difference value can therefore be quantized in accordance with a difference value quantization rule, with the first binary word representing the quantized difference value. Apart from rounding effects, however, a completely lossless compression is also possible.

As already indicated above, the method can be carried out particularly fast in that the difference values of a plurality of respective pixels that are represented by a first binary word are encoded in parallel. This can take place, for example, by graphics processors that are particularly suitable for a parallel and block-wise processing of image data (parallel threads). Such graphics processors are present in many cases on modern graphics cards and are increasingly widespread.

The invention also relates to a method of decompressing image data (decompression method) that comprise a bitstream having a plurality of bits, with the bitstream representing a plurality of pixel values that are associated with a respective pixel, the method comprising the following steps:

fragmenting the bitstream into a plurality of second binary words, with each of the second binary words having a second length that is a predetermined length, in particular a fixed length, of the respective second binary word, with each of the second binary words having at least one encoding information bit at a predetermined position in the second binary word;

decoding at least one first binary word by at least one of the second binary words, with the first binary word representing a difference value that corresponds to a predetermined relation between a pixel value of a respective pixel and an estimated pixel value of the respective pixel, with it being determined whether the encoding information bit of the least one of the second binary words is set to a first value, with the first binary word being completely decoded by a single one of the second binary words when the encoding information bit of the single one of the second binary words being set to the first value and with the first binary word otherwise being completely decoded by a plurality of the second binary words;

determining a modeled estimated pixel value of the respective pixel in dependence on at least one previously decompressed pixel value that corresponds to the at least one predetermined other pixel using an estimation rule; and determining a decompressed pixel value of the respective pixel in dependence on the first decoded binary word and on the mapped estimated pixel value of the respective pixel.

In summary, the decompression method corresponds to a reversal of the previously described compression method. The difference values in the form of first binary words are thus decoded either by single or by a plurality of second binary words of the bitstream. For this purpose, the encoding information bit that is contained in a respective second binary word and that indicates whether a single binary word or a plurality of binary words is/are to be taken into account to achieve a complete or lossless decoding. An encoding information bit is preferably provided in each of the second binary words so that a respective second binary word can always unambiguously be used for a correct decoding of a first binary word. Other approaches are, however, also possible as already mentioned further above as part of the compression.

The decoding of the first binary word by the at least one second binary word is to be understood in the sense that the first binary word is determined on the basis of the at least one second binary word. This can be interpreted as a decryption of the first binary word from the at least one second binary word. Conversely, the encoding of the first binary word by the at least one second binary word is to be understood in the sense that the at least one second binary word is determined on the basis of the first binary word.

The determination of the mapped estimated pixel value of the respective pixel takes place completely analogously to the determining of the estimated pixel value as part of the compression, with specific information such as weighting factors for predetermined other pixels being able to be provided, e.g. as an element of the estimation rule, during the decompression. Such a provision of information is known from the field of linear prediction.

In accordance with an embodiment of the decompression method, the first binary word is decoded by the at least one second binary word in that the encoding information bit is removed from the at least one second binary word to form the first binary word or a partial word of the first binary word. The removal of a respective encoding information bit is preferably applied in both decoding cases, i.e. both in the decoding by a single second binary word and in the decoding of a plurality of second binary words.

It is possible that the encoding information bit in a respective second binary word always has the position of the least significant bit. Once the encoding information bit has been removed, bits remain. These remaining bits can directly form the first binary word to be decoded or a partial word thereof. The remaining bits preferably form the first binary word when the removed encoding information bit has the first value and the encoding information bit of the previous second binary word likewise has the first value. Otherwise the bits form a partial word. In the case of a decoding by a single second binary word, the last bit set to one in the ascending order of the remaining bits is equal to the last bit, i.e. to the most significant bit. If, however, zero bits are still present in the remaining bits after the last one bit, these zero bits can be automatically cut off or removed so that the first binary word does not comprise these zero bits. In this manner, the first binary word can be exactly decoded with the first length that formed the basis of the preceding encoding.

It is understood that within the framework of the decompression a plurality of first binary words can be decoded in parallel so that the decompression of the total image data is substantially accelerated. For this purpose, graphics processes can e.g. be used as in the compression.

In accordance with a further embodiment of the decompression method, the first binary word is decoded by the plurality of second binary words in that the following steps are carried out:

identifying a set of second binary words that corresponds to the plurality of second binary words for decoding the first binary word, with the second binary words of the set being identified in that, starting with a respective second binary word of the bitstream whose encoding information bit is not set to the first value and that forms a first element of the set, the respective encoding information bits of the second binary words following in accordance with an ascending order of the bitstream are evaluated to determine whether the respective encoding information bits are set to the first value, with the subsequent second binary words forming further elements of the set when the respective encoding information bits are not set to the first value, with that one of the subsequent second binary words whose encoding information bit is set to the first value forming the last element of the set;

forming a plurality of partial words in that at least the encoding information bit is removed from each of the second binary words of the set; and forming the first binary word in that the plurality of partial words are concatenated with one another.

It is understood that the identifying of the set of a plurality of second binary words, the forming of the partial words, and the forming of the first binary word do not necessarily have to be carried out consecutively for all the involved words. It is thus possible that the second binary words are processed at least partly in parallel to decode a respective first binary word. Furthermore, second binary words can be evaluated after one another with respect to their respective encoding information bits in their order of the bitstream to decide whether further subsequent second binary words are to be taken into account or not. If the evaluation of the encoding information bit has the result that at least one subsequent secondary binary word is still to be taken into account, a partial word can already be formed and stored by removing the respective encoding information bit. Subsequent partial words can be stored in the same manner, with these partial words already being able to be concatenated with one another to successively form the first binary word by a stringing together of partial words. In other words, the steps for decoding with respect to consecutive second binary words can also be alternately nested within one another.

The partial words are preferably concatenated in an order that is the reverse of the ascending order of the bitstream in which the partial words appear. For example, the first element of the set (a second binary word having an encoding information bit not set to the first value) can include the least significant bit for the first binary word to be decoded. The last element of the set (a second binary word having an encoding information bit set to the first value) can in contrast include the most significant bit for the first binary word to be decoded. The set can accordingly have an "identification order" that corresponds to the ascending order of the second binary words in the bitstream in which the second binary words have been identified. In contrast, the formed partial words can be concatenated or strung together with one another in the reverse order. This has the advantage that, on the one hand, a respective first binary word can be sequentially encoded by the plurality of second binary words, i.e. how many secondary binary words are needed does not have to be clear in advance. On the other hand, the reverse order of the second binary words in the bitstream has the result that it can be determined directly by a "first" secondary binary word (first element of the set) that a plurality of second binary words re needed for the decoding. How many second binary words have to be taken into account likewise does not have to be immediately clear in this respect. The set of second binary words can rather be sequentially identified in that the respective encoding information bits are evaluated.

As already indicated above, in addition to the encoding information bit from the last of the formed partial words, zero-value bits that are present after the last bit set to one (most significant bit) can be automatically removed. This is, however, not absolutely necessary.

It is understood that features that have been disclosed in connection with the compression method can be implemented in a corresponding or reverse manner in the decompression method. Conversely, features that have been disclosed in connection with the decompression method can be implemented in a corresponding or reverse manner in the compression method. The compression method and the decompression method can furthermore also be carried out after one another, i.e. the embodiments can also be combined with one another.

The invention further relates to a data carrier having software stored on the data carrier for carrying out the method in accordance with one of the embodiments of the compression method and/or of the decompression method described here. The software can also be firmware, i.e. embedded software.

The invention furthermore relates to an apparatus having a data carrier, in particular the above-named data carrier, and having a computing device, with the computing device being adapted to execute the software stored on the data carrier. The computing device can have at least one graphics processor and/or can be connected to at least one graphics processor, in particular to execute the software or to operate the computing device in accordance with the software. The software can furthermore generally be implemented by a field programmable gate array (FPGA). It is, however, understood that the computing device does not necessarily have to have these means and that the method can also otherwise be efficiently carried out.

The apparatus can generally be configured for recording a time sequence of frames. The apparatus can in particular be a motion picture camera. The computing device of the apparatus is preferably configured to compress at least one of the frames in accordance with the above-described compression method. With respect to a decompression of the image data, the computing device can also be configured to decompress a bitstream that represents at least one of the frames in accordance with the above-described decompression method. This can in particular also be advantageous on a motion picture camera so that a respective frame can e.g. be directly displayed on a display apparatus of the apparatus or can be transmitted to an external display apparatus. The image data do not have to be made available in an uncompressed form here, but can rather be directly compressed after the recording of the image data. The image data are preferably transmitted in compressed form so that, on the one hand, less bandwidth is required for the transmission (fast transmission) and, on the other hand, however, less memory space is also required for the storing of the data. For example, the compressed image data can be easily transmitted to a remote server on which a virtual cloud for image data has been installed. A compression or decompression is even possible in real time thanks to the methods described here so that e.g. frames can be compressed and transmitted to a remote location directly after their recording.

The methods can generally also be implemented in other apparatus, e.g. in a digital microscope that can in particular be used in the medical field, for instance for carrying out operations.

The invention generally also relates to software on a data carrier, with the software being configured to execute at least one of the methods described herein.

The invention will be described in the following only by way of example with reference to the drawings, wherein.

In the following, elements that are the same or that correspond to one another are marked by the same reference numerals unless a special distinction is required between specific examples of elements.

Figure 1:
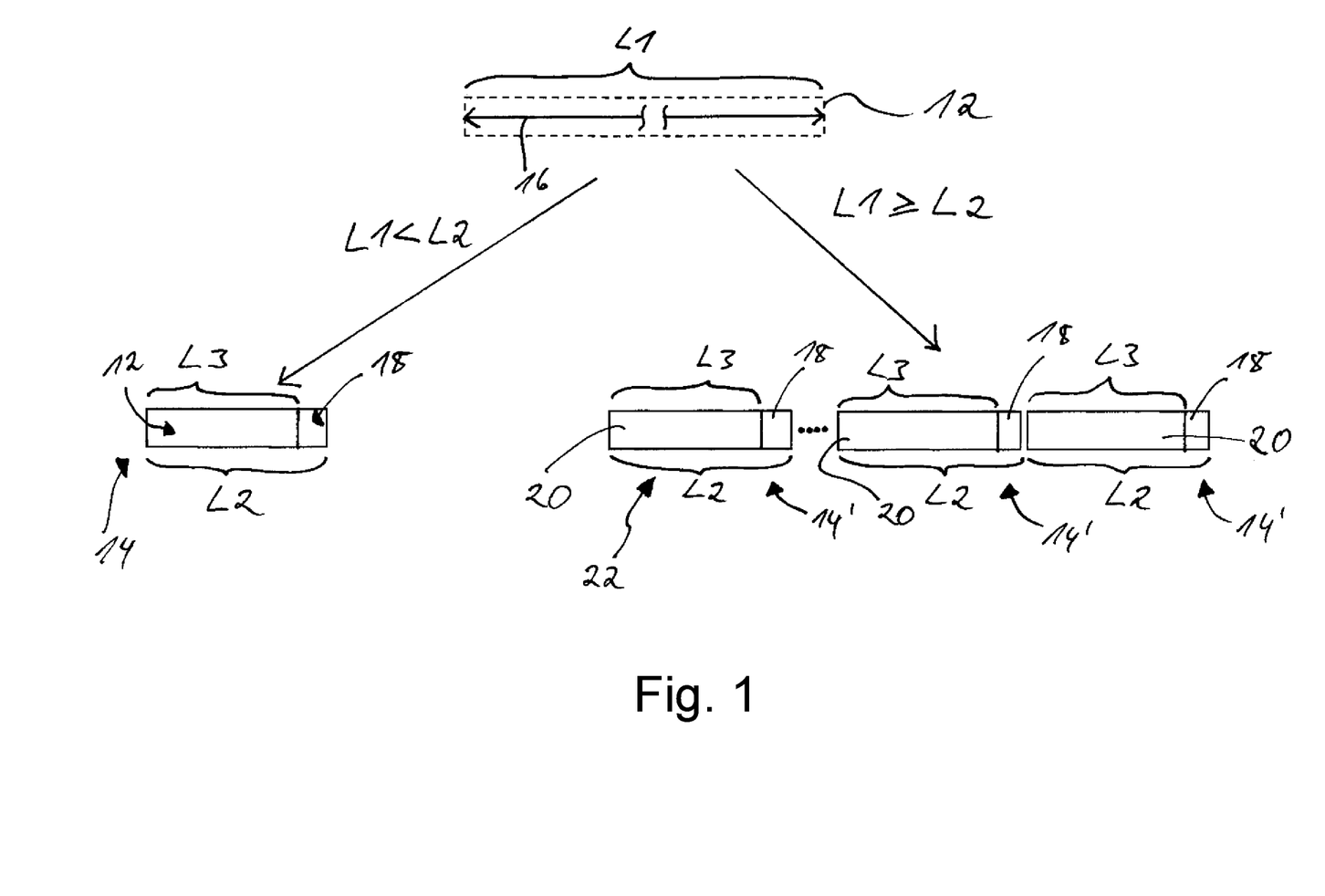
FIG. 1 shows a schematic diagram that generally illustrates an encoding of a first binary word by at least one second binary word.

A method of compressing image data is illustrated in FIG. 1 in which a first binary word 12 is encoded by at least one second binary word 14, 14'. The first binary word 12 represents a difference value of a respective pixel of the image data, with the difference value corresponding to a predetermined relation between a pixel value and an estimated pixel value of the respective pixel (not shown). The difference value can, for example, represent the difference between the (actual) pixel value and the estimated pixel value. The estimated pixel value of the respective pixel can be determined in dependence on the pixel value of at least one predetermined other pixel of the image data using at least one estimation rule (not shown). For example, the estimated pixel value can be formed as a weighted combination of the pixel values of other pixels, with the weighting coefficients e.g. being able to be determined by the minimization of the mean squared error between the pixel value and the estimated pixel value of the respective pixel. It is understood that the image data comprise a plurality of pixel values that are each associated with a pixel. At least some of the pixel values can thus each be converted into an associated difference value that is either directly present in the form of a first binary word (in particular on the performance of the method on a binary processor) or is converted into a first binary word from a different numerical system. A plurality of first binary words thus have to be encoded for the compression of the image data, with only one respective first binary word 12 that is to be encoded being looked at in the following for easier understanding.

The first binary word 12 has a first length L1 that is a first effective length of the first binary word 10. If the first binary word 12 is e.g. equal to (001011), the first length L1 is equal to 4 since, starting with the least significant bit (the bit at the far outside right in the bit sequence 001011), the last one bit is at the fourth position and thus in particular represents the most significant bit in the binary system. If the first binary word 12 is equal to (101100), the first length L1 is equal to 6 since the last one bit is at the sixth position (at the far outside left in the bit sequence 101100). The first length L1 is thus generally variable, namely in dependence on the position of the last one bit in a binary word. This is indicated by the broken arrow 16.

Depending on the length L1, the first binary word is encoded either by a single second binary word 14 or by a plurality of second binary words 14'. The encoding takes place by the single second binary word 14 when the first length L1 is smaller than the second length, i.e. L1<L2 (left branch in FIG. 1). The encoding in contrast takes place by the plurality of second binary words 14' when the first length L1 is greater than or equal to the second length, i.e. L1>L2 or L1=L2 (right branch in FIG. 1).

The encoding by the single second binary word 14 (case L1<L2) preferably takes place by concatenation the first binary word 12 with a single encoding information bit 18 that is set to the value zero and that indicates in this manner that the respective first binary word 12 has been completely encoded by a single second binary word 14. The second binary word 14 has by definition the second length L2 so that the difference between the second length and the number of the encoding information bit 18 is generally a third length L3 that is smaller than the second length L2. Since a single encoding information bit 18 is assumed by way of example in FIG. 1, L3=L2−1.

If the first length L1 is equal to the third length L3, the encoding of the first binary word 12 is only the concatenation or stringing together with the encoding information bit 18. If the first length L1 is, however, smaller than the third length L3, the first binary word 12 is supplemented by a number of zeros so that the second binary word 14 has the second length L2 as a result after the concatenation with the encoding information bit 18. The zero bits are preferably appended at the side of the most significant bit. It is also possible that the one second binary word 14 is defined by zero bits of the length L2 and some of these zero bits are overwritten in accordance with the encoding information bit 18 and the L1 bits of the first binary word 12.

In the case of the encoding by a plurality of second binary words 14' (case L1>L2 or L1=L2), the first binary word 12 is first segmented into a plurality of partial words 20 of the length L3 that are each concatenated with an encoding information bit 18 to form the second binary words 14' (cf.

FIG. 1). The encoding information bits 18 are as a rule set to one to indicate that the first binary word 12 has not yet been completely encoded. An exception from this is the last second binary word 22 in accordance with an ascending order of the second binary words 14' (cf. FIG. 1) that differs from the other second binary words 14' in that the encoding information bit 18 is set to zero. It is hereby indicated that the first binary word 12 has been completely encoded by the last second binary word 22 and by the preceding second binary words 14'. It is understood that the values for the encoding information bit 18 can also be inverted.

The encoding process will be further explained in the following with reference to specific numerical examples.

Figure 2:
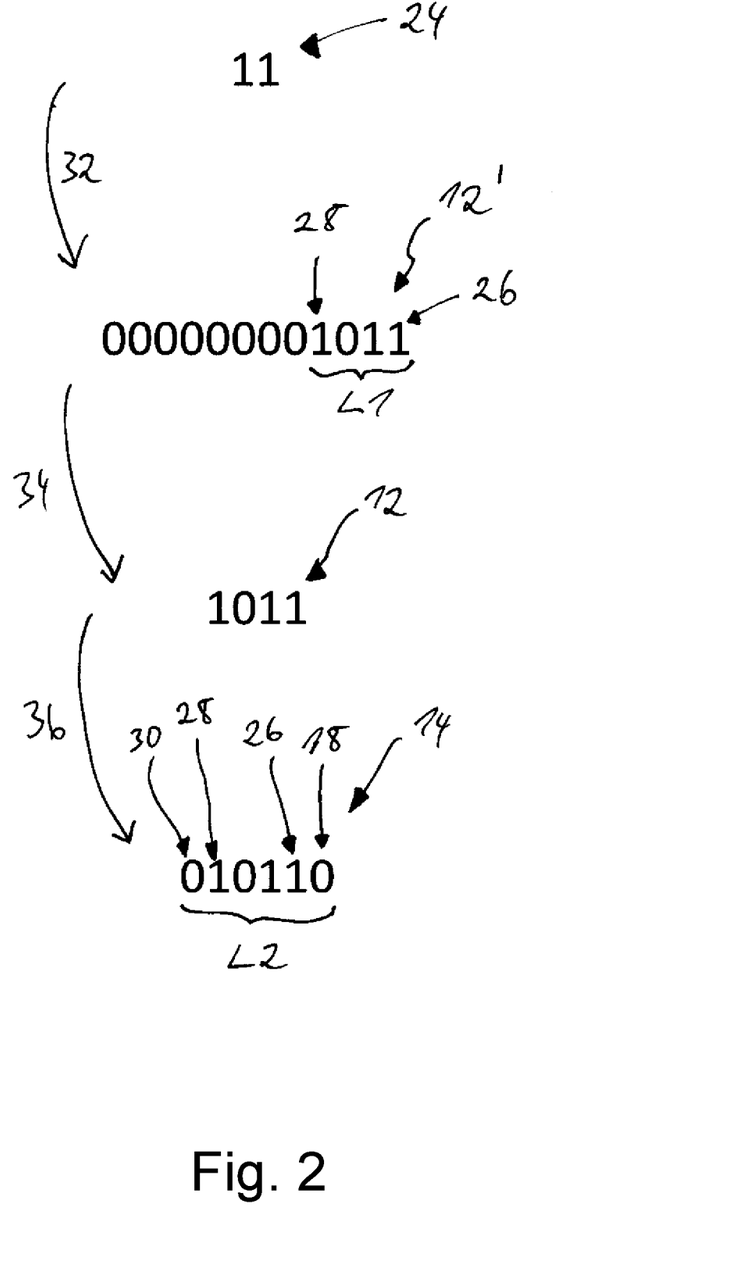
FIG. 2 shows an encoding of a first binary word by a single second binary word.

A difference value 24 is assumed in FIG. 2 that has the value 11 in the decimal system. The difference value 24 is represented by a first binary word 12' that admittedly comprises 12 bits in FIG. 2, but has an effective length L1=4 since the last one bit in the ascending order of the bits is the fourth bit (step 32 in FIG. 2). The ascending order is defined from right to left in FIG. 2, i.e. from the least significant bit 26 to the most significant bit 28.

Those bits of the first binary word 12' that define the first length L1 now form a first binary word 12 that is used as the basis for the encoding (step 34 in FIG. 2). As can be seen from FIG. 2, the first binary word 12 and the first binary word 12' only differ by the zeros on the other side of the last one bit in the first binary word 12'

The first binary word 12 is now encoded by a single second binary word 14 that has the second length L2=6 (step 36 in FIG. 2). Since L1<L2, the encoding information bit 18 that is concatenated with the first binary word 12 at the side of the least significant bit 26 is set to the value zero. Since L2>L1, another zero bit 30 is appended at the side of the most significant bit 28 of the first binary word 12 so that the second binary word 14 has the length L2. In other words, the first binary word 12 is supplemented by a number of zero bits 30 to ensure the second length L2 independently of the first length L1.

Figure 3:
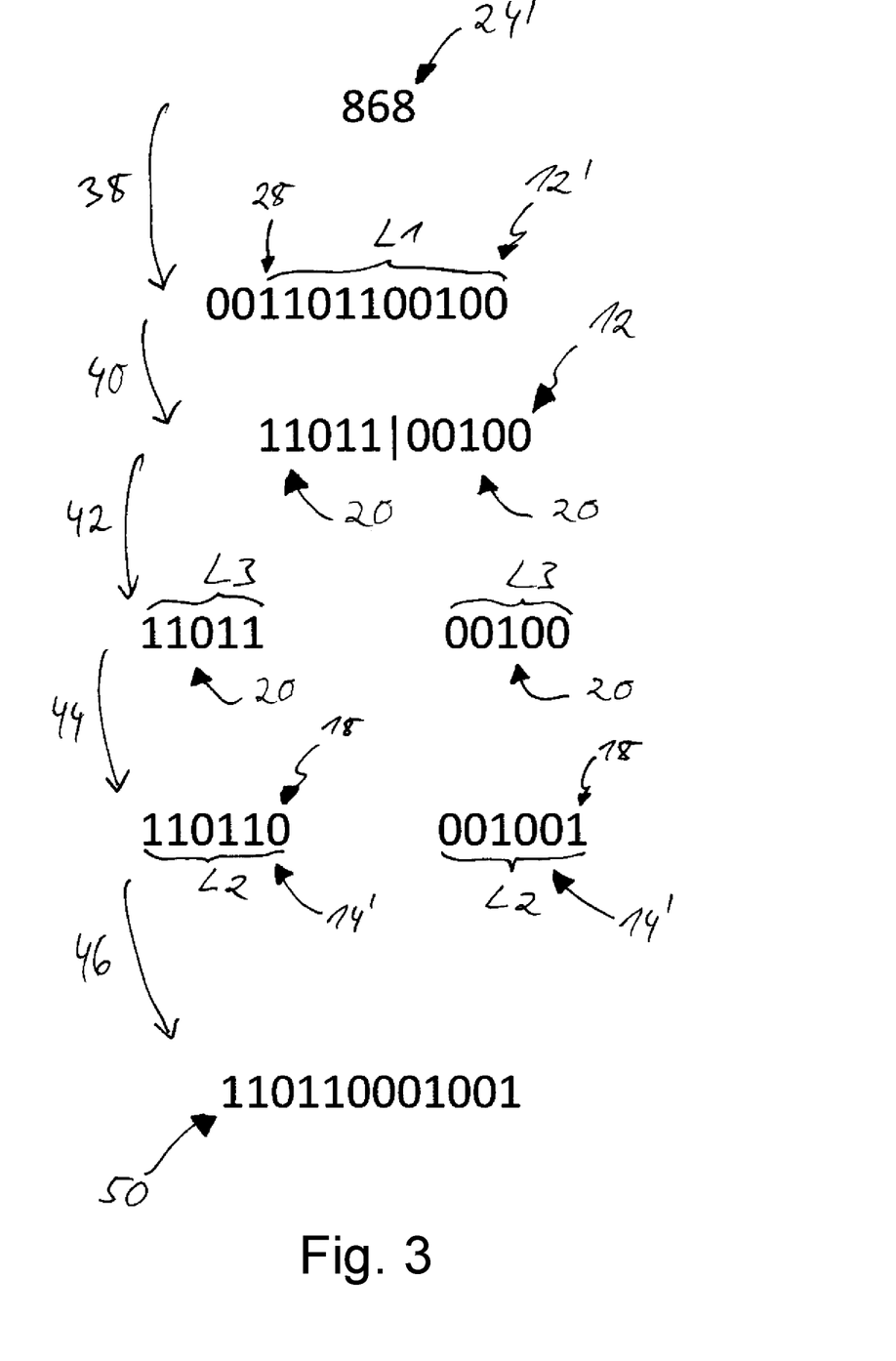
FIG. 3 shows an encoding of a first binary word by a plurality of second binary words.

A further encoding example is shown in FIG. 3 in which a higher difference value 24' is assumed that has the value 868 in the decimal system and is represented by a first binary word 12' that admittedly comprises 12 bits, but has an effective length L1=10 since the last one bit 28 in the ascending order of the bits is the tenth bit (step 38 in FIG. 3). A first binary word 12 having the effective length L1 results in step 40 by cutting off the zero bits following the most significant bit 28. Since an encoding by second binary words 14' of the length L2=6 should equally take place as in FIG. 2, an encoding by a plurality of second binary words 14' is provided for the first binary word 12 due to L1>L2. For this purpose, the first binary word 12 is segmented into partial words 20 (step 40 in FIG. 3), with respective L3 bits being combined to form a partial word 20 in the ascending order of the bits of the first binary word 12 (steps 40 and 42 in FIG. 3). The binary word 12 can be completely segmented into two partial words 20 of the length L3 in FIG. 3. If the length L1 is not divisible by L3 without any remainder, the remaining bits are mapped by a further partial word 20 that is supplemented by zero bits so that the respective partial word 20 likewise has the length L3 (not shown).

The partial words 20 are now each concatenated with an encoding information bit 18 in an analog manner to the example of FIG. 2, with the encoding information bit 18 of the first of the two partial words 20 (at the right in FIG. 3) being set to one (first binary word 12' has not yet been completely encoded), and with the encoding information bit 18 of the second of the two partial words 20 (at the left in FIG. 3) being set to zero (first binary word 12' has been completely encoded), cf. step 44 in FIG. 3. A plurality of second binary words 14' are encoded by the first binary word 12' in this manner. The second or left one of the two binary words 14' corresponds to the last second binary word 22 in FIG. 1. The two second binary words 14' can then be concatenated to form a bitstream 50 or a part of a bitstream, cf. step 46 in FIG. 3. It is also possible to swap over the order of the two second binary words 14'. If the bitstream 50 is read in e.g. from left to right, it is already indicated by the encoding information bit 18 that is first in this order and that then has the value one that even further second binary words 14' have to be taken into account for the decoding.

Figure 4:
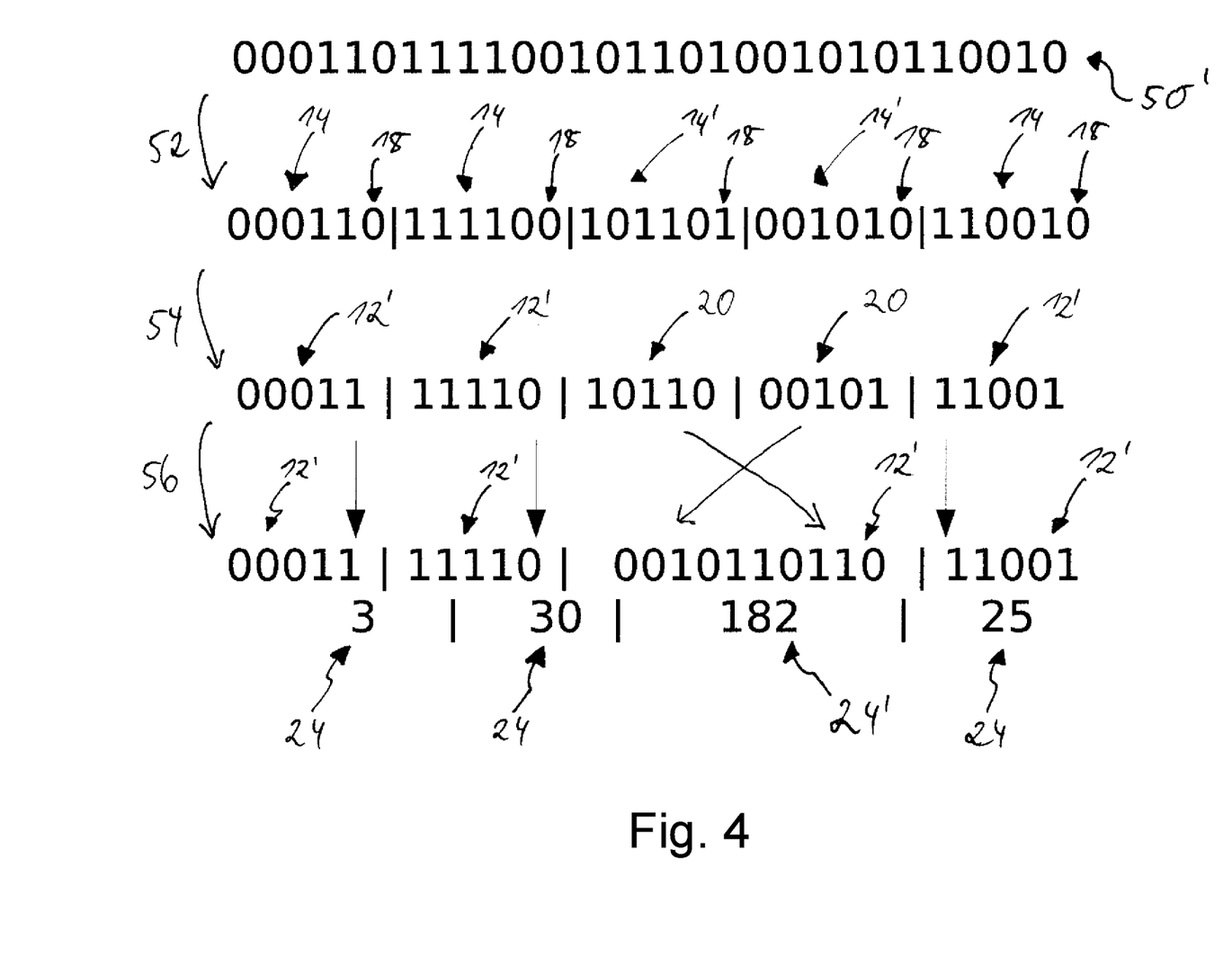
FIG. 4 shows a decoding of a plurality of first binary words by a plurality of second binary words of a bitstream.

An example for the decoding of a plurality of first binary words 12' by a plurality of second binary words 14, 14' is shown in FIG. 4, with the decoding being an element of a method of decompressing image data that comprise a bitstream 50' having a plurality of bits. The bitstream 50' is segmented into a plurality of second binary words 14, 14' that each have the length L2=6 (step 52). The reading in of the bitstream 50' takes place here in an ascending order, with the bits being read in successively, starting with the left outer bit of the bitstream 50' in FIG. 4, up to the outer right bit. A reverse order is, however, also possible. The encoding information bit 18 of each of the second binary words 14, 14' is then evaluated. The encoding information bit is respectively equal to zero for the second binary words 14, i.e. the second binary words 14 each serve for the decoding of a single first binary word 12', with only the encoding information bit 18 being removed for this purpose (steps 54 and 56).

In FIG. 4, the encoding information bit 18 of the second binary word 14' arranged at the middle of the bitstream 50' has the value one, however. It is hereby indicated that a first binary word 12 is to be decoded by this second binary word 14' and by at least one further second binary word 14'. The encoding information bit 18 of the following second binary word 14' again has the value zero. It is hereby indicated that only this following second binary word 14' is to be taken into account for the decoding of the first binary word 12'. A set of second binary words 14' is therefore identified in this manner for the decoding of the first binary word 12'. Partial words 20 are then formed in that the encoding information bits 18 are removed from the second binary words 14' (step 54). The partial words are then concatenated, and indeed in the reverse order of the partial words 20. Since only two partial words 20 are present in the example of FIG. 4, they are therefore first swapped over and then concatenated (step 56). The swapping over results from the circumstance that the first second binary word 14' in the ascending order whose encoding information bit 18 has the value one comprises less significant bits of the first binary word to be decoded, whereas the following second binary word 14' comprises more significant bits.

The first binary words 12' thus decoded can then be converted into difference values 24, 24' and can be converted into the decompressed pixel values in dependence on mapped estimated pixel values. The decompressed pixel values can then be used on a display apparatus to display a frame for a user.

REFERENCE NUMERAL LIST 12, 12' first binary word
14, 14' second binary word
16 length
18 encoding information bit 20 partial word
22 last second binary word
24, 24' difference value
26 least significant bit
28 most significant bit
30 zero bit
32, 34, 36 step
38, 40, 42 step
44, 46 step
50, 50' bitstream
52, 54, 56 step
L1 first length
L2 second length
L3 third length

The invention claimed is:

1. A method of compressing image data that comprise a plurality of pixel values that are associated with a respective pixel, wherein the pixel values are compressed for at least some pixels in accordance with the following steps:
   determining an estimated pixel value of the respective pixel in dependence on the pixel value of at least one predetermined other pixel while using at least one estimation rule;
   forming a difference value (24, 24') of the respective pixel that corresponds to a predetermined relation between the pixel value and the estimated pixel value of the respective pixel, with the difference value (24, 24') being represented by a first binary word (12, 12') that has a first length (L1), with the first length (L1) being an effective length of the first binary word (12, 12');
   encoding the first binary word (12, 12') by at least one second binary word (14, 14'), with the at least one second binary word (14, 14') having a second length (L2) that is a predetermined length of the respective second binary word (14, 14'), wherein the first length (L1) is compared with the second length (L2) to determine whether the first length (L1) is smaller than the second length (L2);
   with the first binary word (12, 12') being completely encoded by a single second binary word (14) when the first length (L1) is smaller than the second length (L2); and
   with the first binary word (12, 12') otherwise being completely encoded by a plurality of second binary words (14').

2. A method in accordance with claim 1,
   wherein the at least one second binary word (14, 14') comprises at least one encoding information bit (18);
   wherein the at least one encoding information bit (18) is set to a first value when the first binary word (12, 12') is encoded by a single second binary word (14); and
   wherein otherwise the at least one encoding information bit (18) of at least one of the plurality of second binary words (14') is set to a second value.

3. A method in accordance with claim 2,
   wherein the step of encoding the first binary word (12, 12') by at least one second binary word (14, 14') comprises:
   appending the at least one encoding information bit (18) to the first binary word (12, 12') or to a partial word (20) of the first binary word (12, 12') to form the at least one second binary word (14, 14'), with the at least one encoding information bit (18) having a predetermined position in the second binary word (14, 14').

4. A method in accordance with claim 3,
   wherein, if the sum of the first length (L1) and the number of the at least one encoding information bit (18) is smaller than the second length (L2), the first binary word (12, 12') is concatenated with a number of zero-value bits (30) so that the at least one second binary word (14, 14') has the second length (L2).

5. A method in accordance with claim 2,
   wherein the first binary word (12, 12') is encoded by the single second binary word (14) in that the first binary word (12, 12') and the at least one encoding information bit (18) are concatenated with one another to form the single second binary word (14).

6. A method in accordance with claim 2,
   wherein the step of encoding the first binary word (12, 12') by the plurality of second binary words (14') comprises:
   segmenting the first binary word (12, 12') into a plurality of partial words (20);
   wherein each of the plurality of partial words (20) has a third length (L3) that is a predetermined length of a respective partial word (20) and that is smaller than the second length (L2);
   wherein one of the plurality of second binary words (14') is associated with each of the plurality of partial words (20); and
   wherein each of the plurality of partial words (20) is concatenated with the at least one encoding information bit (18) of the associated second binary word (14') to form the associated second binary word (14').

7. A method in accordance with claim 6,
   wherein the segmentation of the first binary word (12, 12') into the plurality of partial words takes place in an ascending order of the bits of the first binary word (12, 12');
   wherein a respective partial word (20) is formed by a number of bits of the first binary word (12, 12') that is equal to the third length (L3); and
   wherein, if the third length (L3) is not a whole number multiple of the first length (L1), the last of the plurality of partial words (20) in accordance with the ascending order is formed by a concatenation of a number of zero-value bits with a residual number of bits of the first binary word (12, 12') so that the sum of the number of zero-value bits and of the residual number of bits of the first binary word (12, 12') is equal to the third length (L3).

8. A method in accordance with claim 7,
   wherein the at least one encoding information bit (18) that is concatenated with the last of the plurality of partial words (20) in accordance with the ascending order is set to the first value; and wherein the respective at least one information bit (18) of the remaining partial words (20) is set to the second value.

9. A method in accordance with claim 6,
   wherein the second length (L2) and the third length (L3) differ exactly by the number of the at least one information bit (18).

10. A method in accordance with claim 1,
    wherein the second length (L2) is the same for all the pixels or for a respective pixel group, with a respective pixel group representing a local image region in the image data.

11. A method in accordance with claim 10,
    wherein a plurality of pixel groups are formed in dependence on the similarity of the difference values (24, 24') of the pixels so that the difference values (24, 24') of the pixels of a respective pixel group are more similar to one another than to the difference values (24, 24') of the pixels of a different pixel group.

12. A method in accordance with claim 10,
wherein the second length (L2) is proportional to at least one of:
the amount of the difference values (24, 24') of a respective pixel group; and
the first length (L1) of the first binary words (12, 12') that represent the difference values (24, 24') of a respective pixel group.

13. A method in accordance with claim 1,
wherein, if the first binary word (12, 12') is completely encoded by a plurality of second binary words (14'), the second length (L2) for the plurality of second binary words (14, 14') is constant or differs between the plurality of second binary words (14, 14').

14. A method in accordance with claim 1,
wherein the step of encoding the first binary word (12, 12') by at least one second binary word (14, 14') corresponds to a first encoding method, wherein for at least some further pixels that are not encoded in accordance with the first encoding method the first binary word (12, 12') is encoded in accordance with a second encoding method.

15. A method in accordance with claim 1,
wherein the image data comprise pixel values of a plurality of mutually different colors;
wherein the at least one predetermined other pixel is not arranged directly adjacent to the respective pixel; and
wherein the pixel values of the respective pixel and of the at least one predetermined other pixel have the same color.

16. A method in accordance with claim 1,
wherein the image data comprise pixel values of a plurality of mutually different colors;
wherein the step of determining an estimated pixel value of the respective pixel takes place in dependence on the respective pixel value of a plurality of predetermined other pixels;
wherein some of these pixels are arranged directly adjacent to the respective pixel and the pixel values thereof have a different color than the pixel value of the respective pixel; and
wherein some others of the predetermined other pixels are not arranged directly adjacent to the respective pixel, and the pixel values of these other pixels have the same color as the pixel value of the respective pixel.

17. A method in accordance with claim 1,
wherein the pixels are provided in an arrangement of a plurality of rows, with the pixel values being compressed row-wise, and
wherein the step of determining an estimated pixel value of the respective pixel takes place in dependence on the respective pixel value of a plurality of predetermined other pixels,
wherein the predetermined other pixels are arranged:
in an already compressed row; or
in the row of the respective pixel and in an already compressed row; or
only in the row of the respective pixel.

18. A method in accordance with claim 1,
wherein the image data represent a frame from a time sequence of a plurality of frames.

19. A method in accordance with claim 1,
wherein the method is configured to compress the image data in a lossless manner.

20. A method in accordance with claim 1,
wherein the difference value is quantized in accordance with a difference value quantization rule, with the first binary word representing the quantized difference value.

21. A method in accordance with claim 1,
wherein the difference values (24, 24') of a plurality of respective pixels that are each represented by a first binary word (12, 12') are encoded in parallel.

22. A motion picture camera configured for recording a time sequence of frames, and further configured to compress at least one of the frames in accordance with the method of claim 1.

23. A method of decompressing image data that comprise a bitstream (50, 50') having a plurality of bits, wherein the bitstream (50, 50') represents a plurality of compressed pixel values that are associated with a respective pixel, said method comprising the following steps:
segmenting the bitstream (50, 50') into a plurality of second binary words (14, 14'), with each of the second binary words (14, 14') having a second length (L2) that is a predetermined length of the respective second binary word (14, 14'), and with each of the second binary words (14, 14') having at least one encoding information bit (18) at a predetermined position in the second binary word (14, 14');
decoding at least one first binary word (12, 12') by at least one of the second binary words (14, 14'), with the first binary word (12, 12') representing a difference value (24, 24') that corresponds to a predetermined relation between a pixel value of a respective pixel and an estimated pixel value of the respective pixel,
wherein it is determined whether the encoding information bit (18) of the at least one of the second binary words (14, 14') is set to a first value;
with the first binary word (12, 12') being completely decoded by a single one of the second binary words (14) when the encoding information bit (18) of the single one of the second binary words (14) is set to the first value and with the first binary word (12, 12') otherwise being completely decoded by a plurality of the second binary words (14');
determining a mapped estimated pixel value of the respective pixel in dependence on at least one previously decompressed pixel value that corresponds to the at least one predetermined other pixel using an estimation rule; and
determining a decompressed pixel value of the respective pixel in dependence on the first decoded binary word (12, 12') and the mapped estimated pixel value of the respective pixel.

24. A method in accordance with claim 23,
wherein the step of decoding at least one first binary word (12, 12') by at least one of the second binary words (14, 14') comprises:
removing the encoding information bit (18) from the at least one of the second binary words (14, 14') to form the first binary word (12, 12') or a partial word (20) of the first binary word (12, 12').

25. A method in accordance with claim 23,
wherein a plurality of first binary words (12, 12') are decoded in parallel.

26. A method in accordance with claim 23,
wherein the first binary word (12, 12') is decoded by the plurality of second binary words (14, 14') in that the following steps are carried out:

identifying a set of second binary words (14') that corresponds to the plurality of second binary words (14') for decoding the first binary word (12, 12'), wherein the second binary words (14') of the set are identified in that, starting with a respective second binary word (14') of the bitstream (50') whose encoding information bit (18) is not set to the first value and that forms a first element of the set, the respective encoding information bits (18) of the second binary words (14') following in accordance with an ascending order of the bitstream (50') are evaluated to determine whether the respective encoding information bit (18) is set to the first value, with the subsequent second binary words (14') forming further elements of the set when the respective encoding information bits (18) are not set to the first value, with that one of the subsequent second binary words (14') whose encoding information bit (18) is set to the first value forming the last element of the set;

forming a plurality of partial words (20) in that at least the encoding information bit (18) is removed from each of the second binary words (14') of the set; and forming the first binary word (12, 12') in that the plurality of partial words (20) are concatenated with one another.

\* \* \* \* \*